(12) United States Patent
Peterson

(10) Patent No.: US 7,342,580 B1
(45) Date of Patent: Mar. 11, 2008

(54) SURFACE COMPRESSION BASED ON REFERENCE GEOMETRY IN ANIMATION MODELS

(75) Inventor: Scott B. Peterson, Sunnyvale, CA (US)

(73) Assignee: Pacific Data Images LLC, Redwood City, CA (US)

( * ) Notice: Subject to any disclaimer, the term of this patent is extended or adjusted under 35 U.S.C. 154(b) by 308 days.

(21) Appl. No.: 10/816,623

(22) Filed: Apr. 2, 2004

(51) Int. Cl.
*G06F 17/00* (2006.01)
(52) U.S. Cl. ..................... 345/418; 345/473
(58) Field of Classification Search ............... None
See application file for complete search history.

(56) References Cited

U.S. PATENT DOCUMENTS

| | | | | |
|---|---|---|---|---|
| 6,167,159 | A * | 12/2000 | Touma et al. ............. | 382/242 |
| 6,256,418 | B1 | 7/2001 | Rehg et al. | |
| 6,606,095 | B1 * | 8/2003 | Lengyel et al. ........... | 345/473 |
| 6,831,637 | B1 * | 12/2004 | Mack ....................... | 345/419 |

OTHER PUBLICATIONS

Lee, E., Ko, H., Vertex Data Compression For Triangular Meshes, 2000, Eighth Pacific Conference on Computer Graphics and Applications, pp. 225-234.*
Taubin, G., Horn, W., Lazarus, F., Rossignac, J., Geometry Coding and VRML, Jun. 1998, Proc. of the IEEE vol. 86, No. 6, pp. 1228-1243.*
Deering, M., *Geometry Compression*, Proceedings of the 22nd Annual Convention on Computer Graphics and Interactive Techniques, 1995, ACM Press, New York, pp. 13-20.
Ibarria, L. et al., *Dynapack: Space-Time Compression of the 3D Animation of Triangle Meshes with Fixed Connectivity*, Proceedings of the 2003 Eurographic/SIGGRAPH Symposium on Computer Animation, 2003, pp. 126-135.
Isenburg, M. et al., *Compressing Polygon Mesh Geometry with Parallelogram Prediction*, Proceedings of the Conference on Visualization '02, 2002, IEEE Computer Society, pp. 141-146.
Karni, Z. et al., *Spectral Compression of Mesh Geometry*, Proceedings of the 27th Annual Conference on Computer Graphics and Interactive Techniques, 2000, ACM Press, New York, pp. 279-286.
Lengyel, J. E., *Compression of Time-Dependent Geometry*, Proceedings of the 1999 Symposium on Interactive 3D Graphics, 1999, ACM Press, pp. 89-95.

* cited by examiner

*Primary Examiner*—Ulka Chauhan
*Assistant Examiner*—Said Broome
(74) *Attorney, Agent, or Firm*—Morrison & Foerster LLP

(57) ABSTRACT

A compression system and method compresses three dimensional animation models. The system and method compresses an offset model, representative of a frame in an animation sequence with respect to a reference model from a reference frame of the sequence. The offset model is compressed by predicting the locations of offset vertices on the surfaces of the model based on the local geometry of reference vertices of the reference model. The offset vertex position is subtracted from the predicted position, and the difference is stored in a compressed data file. The prediction differences are easily compressed by any data compressor because the differences are generally small numbers.

75 Claims, 6 Drawing Sheets

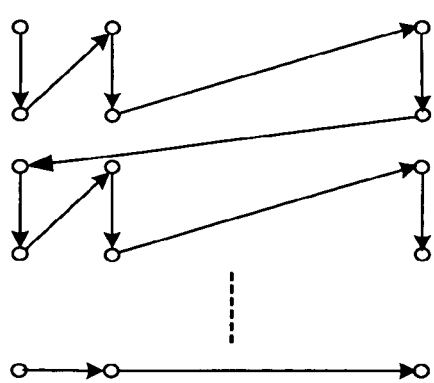
FIG. 6
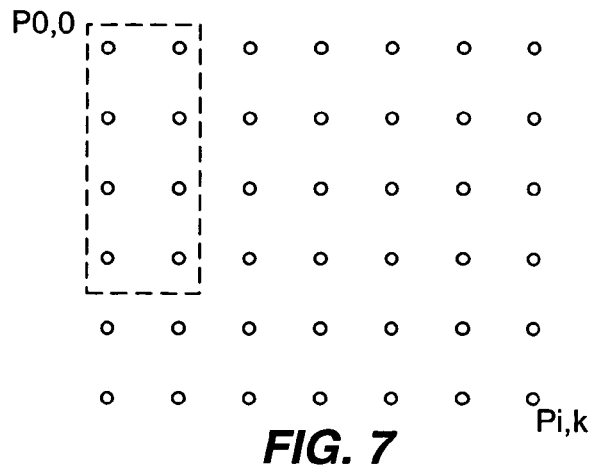
FIG. 7
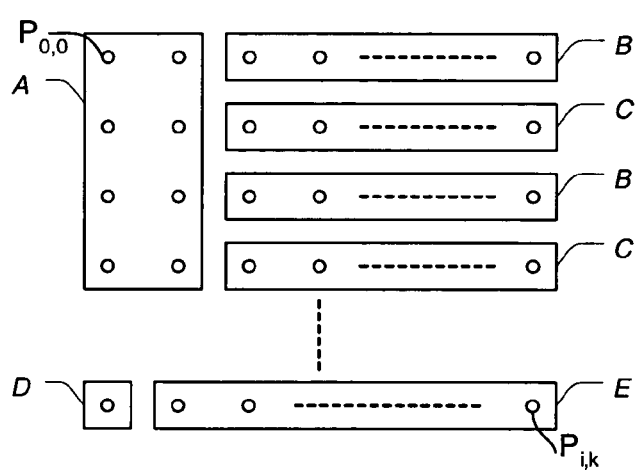
FIG. 8
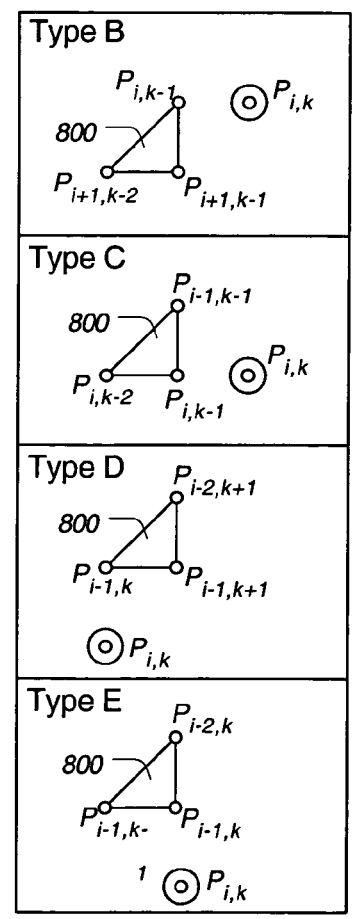

SURFACE COMPRESSION BASED ON REFERENCE GEOMETRY IN ANIMATION MODELS

FIELD OF THE INVENTION

The present invention relates to the compression and storage of animation models, and more particularly, to the compression of the surface geometry of animation models to reduce storage requirements in animation sequences involving large numbers of models.

BACKGROUND OF THE INVENTION

Three-dimensional character animation requires significant storage requirements. To animate a single 3D character (or generally any model) over some interval of time typically requires storing the position of the character at the time of each frame, in order to be able to render the frame. Complex animation sequences can involve hundreds of characters. For example, an animation sequence of a crowd containing 200 different animation cycles would require the storage of the complete position information for each of the 200 characters, for each frame of their respective animation cycles. A typical character cycle may contain thousands of points and hundreds of frames of animation, and the storage requirements for a lengthy cycle can easily reach hundreds of megabytes of storage. Over the course of a feature length animation, these storage requirements quickly mushroom and can easily reach terabytes of storage.

Accordingly, it is desirable to provide a way of compressing character information in animation sequences to reduce storage requirements for character models, and thus by extension, reduces the storage needed for crowds or other complex animation sequences.

SUMMARY OF THE INVENTION

The present invention provides a methodology and system for compressing animation models. The invention is particularly well suited for compressing the information describing the poses of a model during an animation sequence, which may last any number of frames.

Generally, the methodology uses an initial or reference model for selected frames of an animation sequence, and based on the reference model, predicts an offset model in each of a number of subsequent frames. The prediction for the offset model at a subsequent frame is based on the relative position of control vertices on the surface of the model of the reference frame, as those relative positions are mapped onto the surface of the offset model at the later, frame. The differences between the predicted vertices for the offset model and the actual vertices of the offset model are determined. These differences are preferably compressed for storage. The difference information takes a small number of bytes relative to the amount of data to store the actual control vertices information. This prediction process is repeated for each of the subsequent frames (e.g., 100 to 200 frames), using the initial reference frame as the prediction reference. Thus storage savings are achieved directly since the entire model data needs to be stored only for the reference pose, as the subsequent poses are stored in terms of the differences between the reference pose and the predictions for the poses of the offset models. The compression of the difference information yields additional storage savings.

From the compressed model information, any frame of the animation sequence can be retrieved and decompressed, using just the reference frame information and the compressed model for the desired frame. Generally, the control vertices of the reference surface are used to predict the locations of the corresponding vertices on the desired offset model. The compressed prediction differences are decompressed and added to the predicted locations to obtain desired final offset control vertices, thereby reconstructing the model. The degree of error between the original offset model and the reconstructed model is controlled based on quantization applied to the coordinates of the reference control vertices and the differenced between the predicted and actual offset locations during compression.

The present invention has embodiments in various software products including geometry compressor, and a geometry decompressor, as well as in the compressed geometry files themselves. Also, the present invention may be embodied in various systems that include computers executing the geometry compressor and/or geometry decompressor, and preferably data compression and decompression algorithms.

BRIEF DESCRIPTION OF THE DRAWINGS

FIG. 6 illustrates a traversal pattern for traversing control vertices in one embodiment.

FIG. 7 illustrates seed vertices in one embodiment.

FIG. 8 illustrates how basis triangles are selected in one embodiment.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
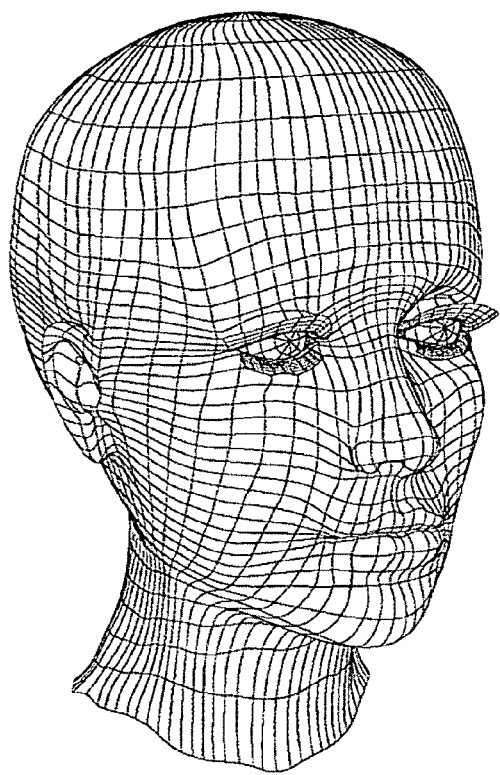
FIG. 1 is an illustration of a typical NURBS model.
Figure 2:
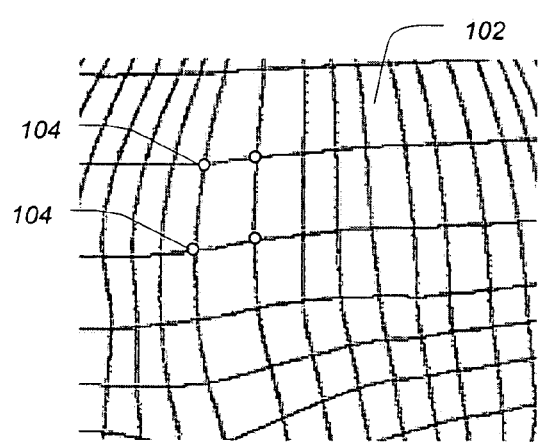
FIG. 2 is a detail of the surface of a model at a given frame.
Figure 3:
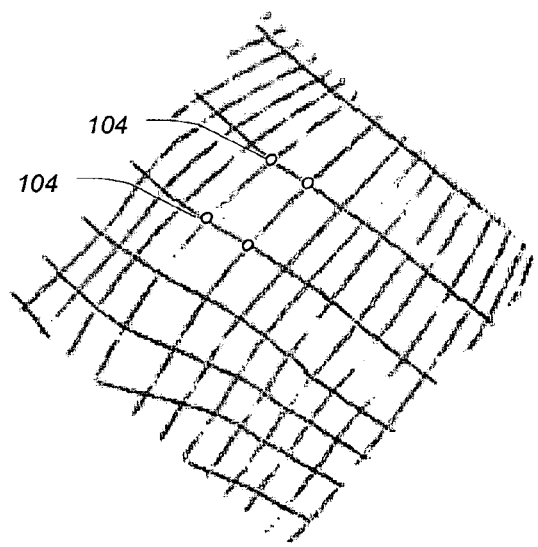
FIG. 3 is a detail of the same surface of the model following a deformation.

Referring to FIGS. 1-3 there is shown various illustrations of a model, as a basis for explaining the operation of the invention. FIG. 1 illustrates an example model 100, here a character's head, based on a NURBS type surface geometry. The model is a plurality of surfaces 102, each surface is composed of a matrix of control vertices 104. FIGS. 2 and 3 illustrate in detail a portion of the model 100, showing a portion of the surface 102 and several vertices 104. Briefly, a surface 102 is described by matrix M of i×k control vertices P, where each vertex P defines a coordinate (x,y,z) in the local space of the model.

FIG. 2 illustrates a pose (or position) of the model at some reference time, and hence is referred to as the reference pose or reference model; by extension each of the control vertices 104 has a particular position at this reference time. The reference time is determined by the animator, and may be understood by analogy to correspond to a snapshot of the model at one particular time during the animation, typically the first frame.

FIG. 3 illustrates the position of the same portion of the model 102 at a later time after the reference time; this position is referred to as the offset or target pose (or position); the terms "offset" or "target" will be used interchangeably. Notice here that this portion of the model as both rotated and deformed with respect to the reference position, and thus each of the vertices 104 has moved with respect to the reference pose.

The model data defining these poses is stored in respective data files, which will likewise be referred to as the reference geometry file, and the offset geometry file. An animation sequence may have any number of frames, depending on the length of the sequence, and for each such frame there is provided a geometry file for the model defining the pose of the model at the frame time. In the context of the present invention, one of these frames is selected as the reference frame. The model associated with such reference frames will be the reference geometry model. One of the features of the invention is the ability of the user to trade off compression ratio and geometry accuracy. The amount of compression increases as the value of quantization increases (i.e. a high error tolerance produces a high compression ratio). The frames and associated models following the reference frames are the offset frame and offset models respectively.

Figure 4:
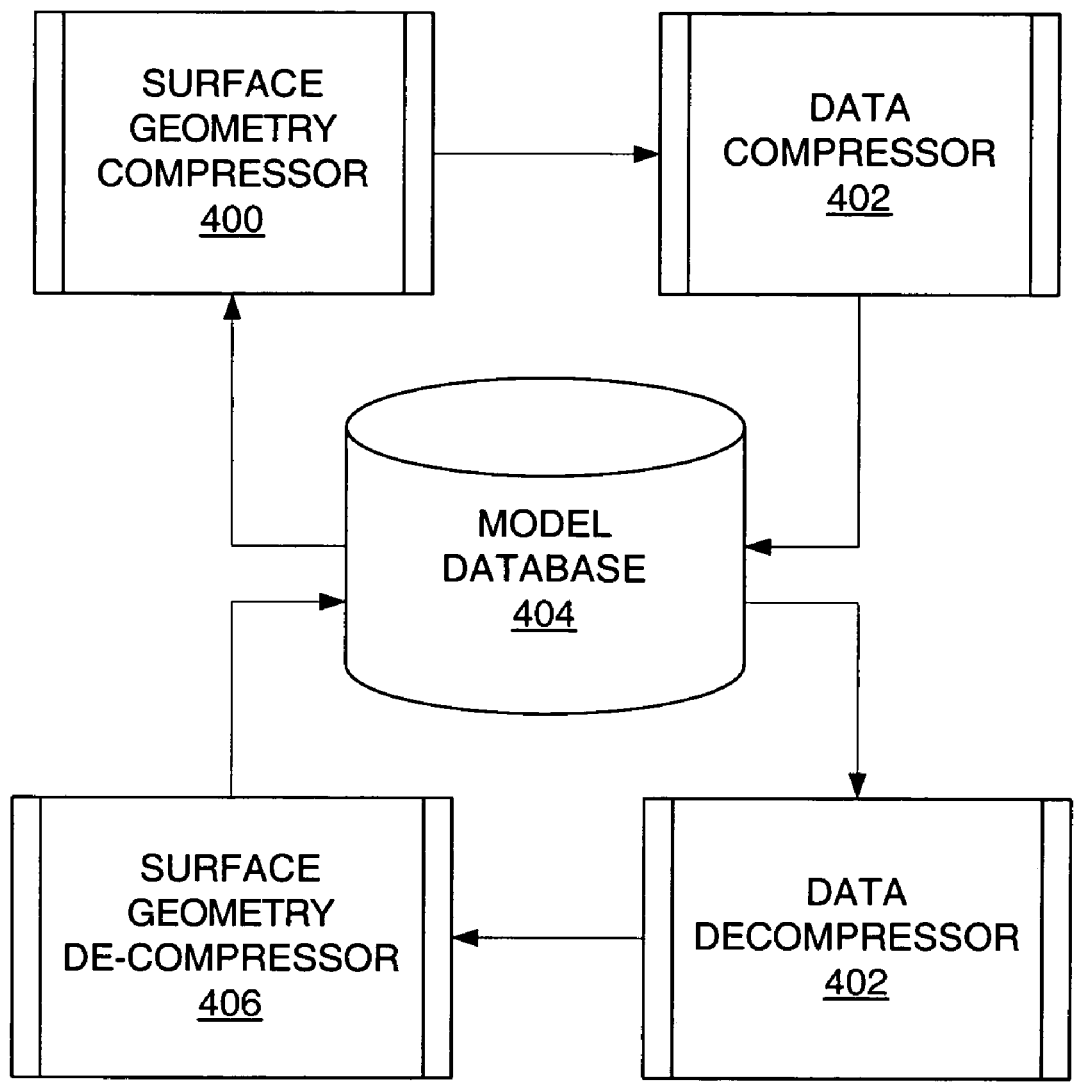
FIG. 4 is system diagram for an embodiment of the invention.

FIG. 4 illustrates a general software architecture for a system to provide compression of animation models. Generally, a model database 400 stores the geometry files for the animation sequence. Each geometry file is associated with a particular frame in the sequence, and has a file name that uniquely identifies the file; additional identifying information is typically stored in metadata for the file. A surface geometry compressor 402 reads reference geometry and offset geometry files from the database 400, and generates compressed geometry data. The compressed geometry data may be understood to express the offset file as the differences between predictions of the positions of the control vertices of the offset pose and the actual positions of the control vertices in the reference pose. The quantized prediction differences (deltas) are then provided to the data compressor 404 which performs a further level of byte reduction. The data compressor 404 can be any available general (that is, data independent) compression algorithm. In one embodiment the data compressor 404 is a Lempel-Ziv type compressor, such as gzip. The resulting compressed file is stored back to the model database. A complementary geometry decompressor 406 and data decompressor 408 provide the corresponding decompression functions, and thus can be used to decompress the files when needed to render the models into the final animation sequence.

Figure 5:
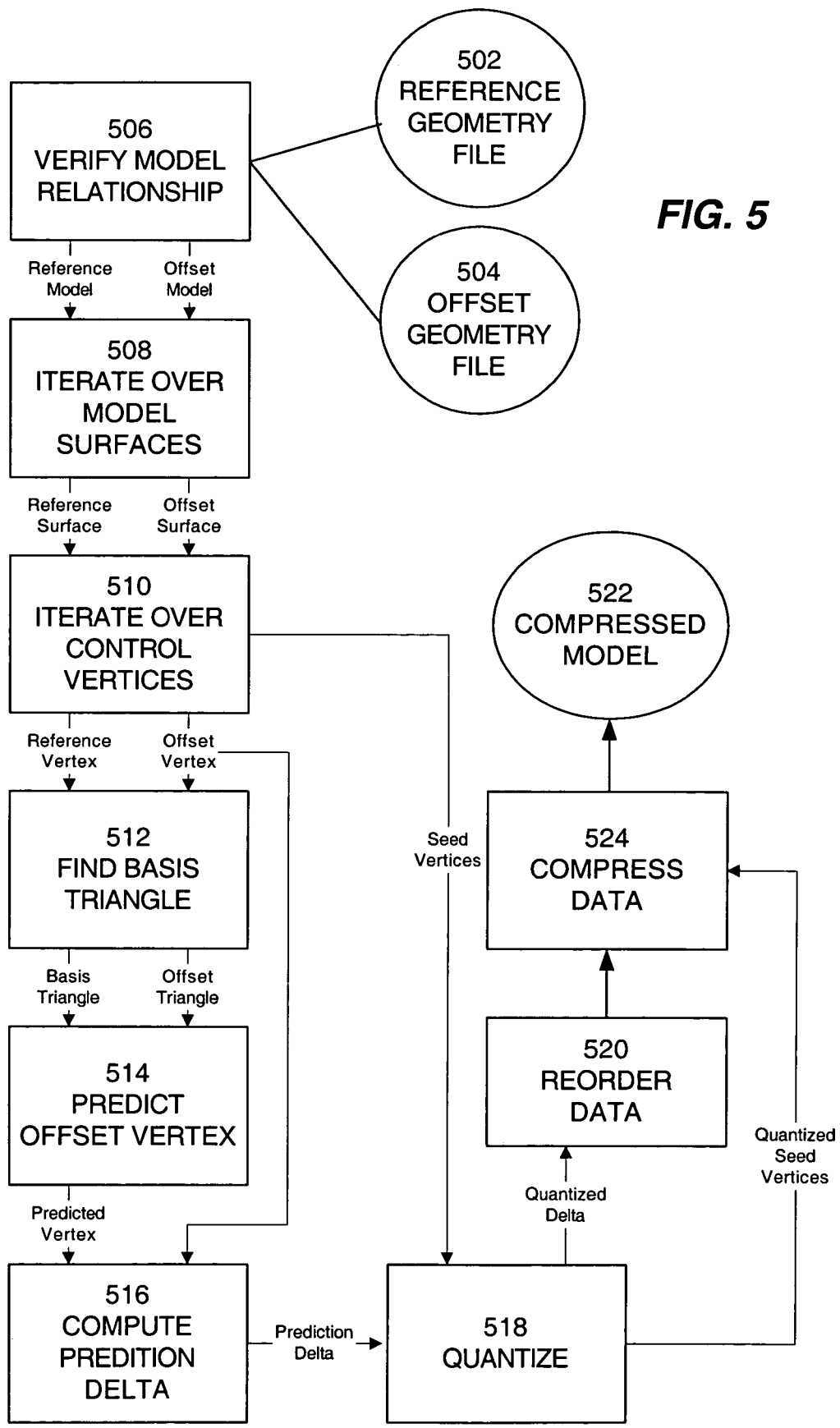
FIG. 5 is a data flow diagram showing the data flow in one embodiment of the compression process.

FIG. 5 illustrates the software architecture of the system in more detail, and will be referred to in the following discussion of the compression aspects of the present invention. Generally, the geometry compressor 404 takes as inputs a reference geometry file 502, an offset geometry file 502, and the name of the compression file 520 into which it will store the resulting compressed model information. The geometry compressor 404 also takes as an input a quantization value, which represents the maximum tolerance for error for each control vertex.

The geometry compressor 404 first verifies 506 the relationship between the reference geometry file 502 and the offset geometry file 504, specifically that these files are for the same model. This is done checking that the files include the same model name, the same number of surfaces, and the same number of control vertices within each surface; this information is typically stored in the metadata for the geometry files.

Next, the geometry compressor 404 traverses each surface sequentially in the reference geometry file 502, and locates the corresponding surface in the offset geometry file 504. Each surface has a unique name, which is used to match the surfaces between the files. The following steps of the compression operation take place within the scope of this traversal, so that for each surface the geometry compressor 404 produces a corresponding compressed representation that is included in the compressed model 522.

As noted above, each surface comprises a set of points or control vertices, forming a rectangular matrix P[i,k]; each control vertex has a unique ID. The geometry compressor 404 traverses 510 over the set of control vertices in the reference geometry file 502, and uses the control vertex ID to locate the corresponding offset vertex $O_{i,k}$ in the offset geometry file 504 (we will use $O_{i,k}$ when referring to the actual value of the offset vertex retrieved from the offset geometry file, and $P'_{i,k}$ when referring to the predicted offset vertex). The traversal pattern is preferably in a zig-zag pattern as illustrated in FIG. 6. This traversal process proceeds along the first two rows of vertices, as illustrated by points $P_{0,0}$ to $P_{0,k}$ for the first row, and points $P_{1,0}$ to $P_{1,k}$ in the second row. When the last vertex in the second row $P_{1,k}$ is reached, the next two rows $P_2$ and $P_3$ are traversed, and so forth. If there are an even number of rows, than the traversal ends with the last element of the last even row. If there are an odd number of rows, then the last row (shown as $P_{i,0}$ to $P_{i,k}$ in FIG. 6) is traversed directly across.

During this traversal step, the geometry compressor 404 first selects a set of seed vertices. The seed vertices are used as the basis for prediction for other vertices in the same or nearby rows of points. As such, these vertices are themselves not compressed. At least the first three points in the traversal are used as seed vertices, but the selection of other seed points may be made based on algorithmic or implementation efficiency. FIG. 7 illustrates the seed vertices for a typical surface, here the vertices comprise the first two columns of the surface, excepting the last row. In this approach, a set of seed vertices is selected for each pair of rows. Alternatively, a single common set of seed vertices may be selected for the entire surface, for example, the four vertices in the upper left corner of the surface. The use of seed vertices for each pair of rows reduces overall compression slightly, but also reduces the amount of compression error that can occur when compression and decompression takes place on computer systems with different floating-point processors.

The selected seed vertices are quantized 518, and passed to data compressor 406, which compresses 524 them and stores them in the compressed model file 522. The quantization function divides each coordinate value of the vertex by an error tolerance, rounds to the nearest integer, and multiplies by the tolerance value again. In one embodiment, the quantization function quantizes the floating-point representation of the vertices by truncating the mantissa of the floating-point number such that the absolute value of (quantized number−original) is less than an error tolerance.

After selecting the seed vertices, the geometry compressor 404 continues with the traversal and selects the next vertex on the surface. For example, if the first two columns are selected as the seed vertices, then the third vertex in the first row, $P_{0,2}$ will be next selected. Reseeding every two rows also reduces the propagation of error when used on different architecture.

The geometry compressor 404 next identifies 512 a basis triangle for the selected vertex, where the basis triangle comprises other control vertex on the surface. A basis triangle on the offset model is also selected. The basis triangle will be used to determine the relative position of the selected vertex with respect to the surface, using the basis triangle as local coordinate frame of reference. The basis triangle may be selected in various different ways from the set of vertices on the surface consisting of seed points and points that have already been traversed by the algorithm. The basis triangle is selected so that each of its vertices are geometrically nearby the point being compressed.

One way to select the basis triangle is find the closest triangle to the selected vertex. Another way to select the basis triangle is to select the triangle based on a predetermined pattern that determines the closest triangle based on which row of the surface the vertex is in. FIG. 8 illustrates this approach.

In FIG. 8 on the left side, each vertex belongs to one of five regions designated as A, B, C, D, and E. Each vertex in regions B, C, D, and E have a nearby basis triangle. The vertices within each region share in common a pattern to identify the nearby basis triangle as illustrated on the right.

Area A are the seed vertices. For these vertices no basis triangles are selected.

Areas B are the odd rows, excepting the last row E. For control vertices $P_{i,k}$ in odd rows, the basis triangle 800 is selected as the vertices:

Basis triangle for odd rows: $P_{i,k-1}$, $P_{i+1,k-1}$, $P_{i+1,k-2}$.

Areas C are even rows. For control vertices $P_{i,k}$ in even rows, the basis triangle 800 is selected as the vertices:

Basis triangle 800 for even rows: $P_{i-1,k-1}$, $P_{i,k-1}$, $P_{i,k-2}$.

Area D is a singular case, the left most vertex in the last row of the surface, if the last row is odd. For this control vertex the basis triangle 800 is selected as the vertices:

Basis triangle 800 for vertex D: $P_{i-1,k-1}$, $P_{i,k+1}$, $P_{i,k-2}$.

Finally, for the last row of the surface, if it is odd, area E, the basis triangle 800 is selected as the vertices:

Basis triangle 800 for last row, excepting vertex D: $P_{i-1,k-1}$, $P_{i-1,k}$, $P_{i-2,k}$.

The use of the foregoing basis triangles based on the row of the selected vertex location with the zig-zag traversal method by which the geometry compressor 404 traverses the surface. More particularly, the basis triangle pattern ensures that for any given vertex, all of the vertices of the basis triangle will either be seed vertices or previously traversed.

A basis triangle defines a local coordinate system that is used to predict 514 the position of the selected control vertex on the offset surface, that is, the offset vertex. The basis triangle <A, B, C> defines two direction vectors, t and s, where t=C−A, and s'B−A, and a normal vector r, which is perpendicular to t and s and has a magnitude equal to the average of |t| and |s|. r can be defined as follows:

$$\vec{r} = \frac{\vec{t} \times \vec{s}}{|\vec{t} \times \vec{s}|}$$

Figure 9:
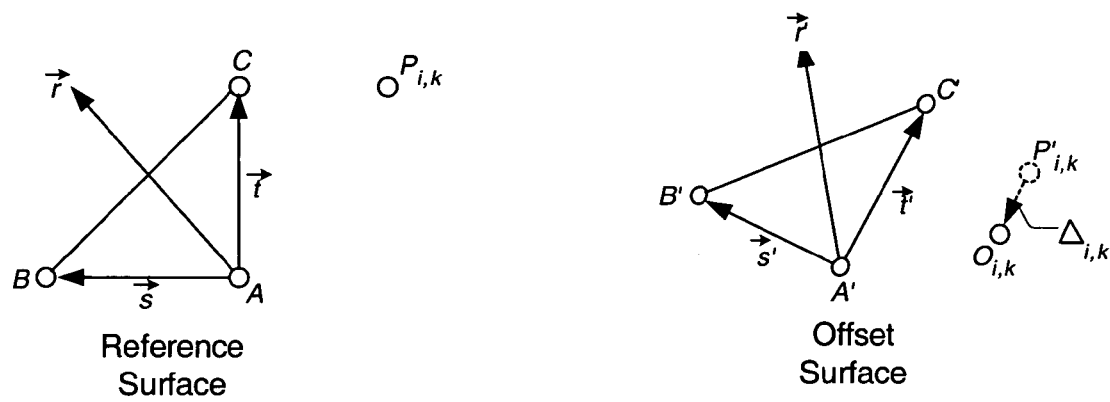
FIG. 9 illustrates the prediction of an offset vertex in one embodiment.

FIG. 9 illustrates these relationships on the reference surface showing basis triangle <A, B, C>, and on the corresponding offset surface, where there is an offset basis triangle <A', B', C'>, with corresponding direction vectors t' and s', and normal vector r'. A given control vertex $P_{i,k}$ is shown as well for the reference surface, and the actual location of the corresponding offset vertex $O_{i,k}$.

The geometry compressor 404 predicts 514 the position of the offset vertex $P'_{i,k}$ from the vertices of the basis triangle on the reference surface. In one embodiment, this is done as follows. As a preliminary, the control vertices A, B, and C have coordinates in the world space of the model, which coordinates can be represented as a vector. First, the selected control vertex $P_{i,k}$ is located on the reference surface in terms of t, s, and r. Next, this coordinate location is multiplied by the offset basis triangle's coordinate frame, t', s', and r'. This yields the predicted location of the offset vertex $P'_{i,k}$.

Mathematically, this process can be described by the following:

$$\vec{P}'_{i,k} = (\vec{P}_{i,k} - \vec{A}) * \begin{bmatrix} \vec{s} \\ \vec{t} \\ \vec{r} \end{bmatrix}^{-1} \begin{bmatrix} \vec{s}' \\ \vec{t}' \\ \vec{r}' \end{bmatrix} + \vec{A}' \qquad \text{(Eq. 1)}$$

where $$\begin{bmatrix} \vec{s} \\ \vec{t} \\ \vec{r} \end{bmatrix}$$

denotes a 3×3 matrix representing the coordinate frame derived from the basis triangle <A, B, C>, and $$\begin{bmatrix} \vec{s} \\ \vec{t} \\ \vec{r} \end{bmatrix}^{-1}$$

is its inverse, where A, A', P, and P' are row vectors and all defined in world space for the model.

Given the predicted offset vertex $P'_{i,k}$, the geometry compressor 404 next determines 516 a prediction delta $\Delta_{i,k}$ by subtracting the prediction $P'_{i,k}$ from the actual offset vertex position $O_{i,k}$, which value was previously retrieved from the offset geometry file 504. The prediction delta $\Delta_{i,k}$ is then quantized 518, and then added back onto the predicted offset vertex $P'_{i,k}$. The combined value is stored in memory, and will be used as needed as a vertex of a basis triangle <A', B', C'> on the offset surface when the geometry compressor 404 reaches control vertices later on the surface. If any of the coordinate frames are degenerate (i.e., the determinant of either of the 3×3 matrices equals 0), then the following equation is used:

$$\vec{P}'_{i,k} = (\vec{P}_{i,k} - \vec{A}) + \vec{A}' \qquad \text{(Eq. 2)}$$

The above prediction process continues over all of the control vertices for the current surface. The resulting data will be a set of seed point coordinates and the quantized prediction deltas Δ. Seed point coordinates are passed directly to the data compressor 404 to compress and store in the compressed geometry file 522. Prediction deltas are passed to a data reordering process 520. The reordering process 520 reorders the coordinate data of prediction deltas so that each vector component is stored contiguously. Thus, given that the deltas have coordinates <$x_1$, $y_1$, $z_1$>, <$x_2$, $y_2$, $z_2> \ldots <x_n, y_n, z_n>$ first all of the x components are collected (in the same order as the vertices), then all of the y components, and finally all of the z components. The resulting array $<x_1, x_2, \ldots x_n, y_1, y_2, \ldots y_n, z_1, z_2 \ldots z_n>$ is then passed to the data compressor 406, which compresses the bytes and stores it to the compressed geometry file 522. The data reordering takes advantages of the entropy encoding of the data compressor by clustering the component values together.

This process is repeated for each surface in the reference geometry file 502. The compressed coordinate strings for the surfaces are stored in the compressed geometry file 522 in the same order as the surfaces in the reference model, and thus there is no need to store the name of each file with the deltas. In addition, the seed vertices for each surface are also stored. When the compression for a single offset model is completed, the process is again repeated for each subsequent offset pose, for as many as desired by the animator. The resulting set of data, comprising the reference geometry file 502 and sequence of compressed geometry files 522, represents a portion of the animation sequence.

Figure 10:
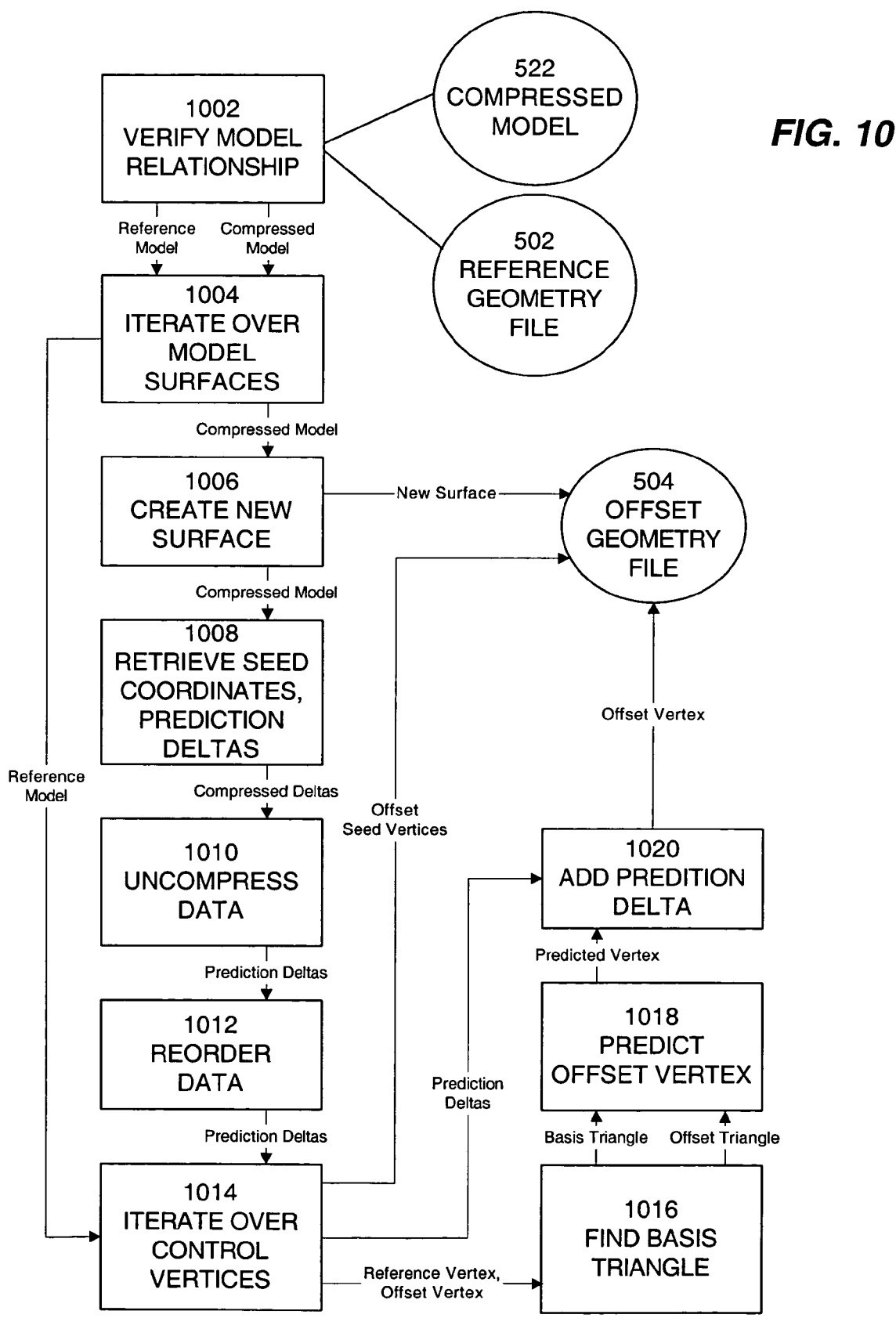
FIG. 10 is a data flow diagram showing the data flow in one embodiment of the decompression process.

The geometry decompressor 406 and data decompressor 408 are used to decompress the compressed geometry files 522. This can be done anytime the underlying models for the animation sequence are needed, for example, for a rendering pass. Generally, the approach iterates over each surface in the reference geometry file, retrieves and uncompresses the seed point coordinates and mangled delta coordinates from the compressed geometry file, reorders the array to obtain the prediction deltas, then uses seed vertices to predict the control vertices, adjusting the predicted location with the corresponding prediction deltas. In one embodiment, the process is detailed as shown in FIG. 10.

A given compressed model 522 is retrieved for decompression, along with a reference geometry file 502. The geometry decompressor 406 verifies 1002 the model relationships, again based on metadata in the respective files. The geometry decompressor 406 traverses 1004 each surface (compressed coordinate string) sequentially in the compressed file 522, and creates 1006 a corresponding new surface and associates it with an output offset geometry file. The duplicate surface will be referred to as the offset surface; this is the surface that will be reconstructed from the compressed geometry. The use of the reference geometry file 502 to reconstruct any of the offset geometry files 504 in the animation cycle is beneficial since it substantially reduces network traffic between the data servers storing the model data and the compute servers performing the decompression. This is particularly true in a rendering environment that uses network caching to store the reference model locally on the rendering computer, instead of having to repeatedly download the reference model. It is further beneficial as it eliminates the need to decompress any intermediate models between the reference geometry file 502 and the selected compressed model 522. In other words, decompression of an Nth compressed model does not depend on the decompression of the N-1th model. In contrast, other approaches typically rely on sequential decompression of models. The geometry decompressor 406 next retrieves 1008 the seed coordinates from the compressed file 522 for the current surface and the compressed prediction deltas Δ. The geometry decompressor 406 calls the data decompressor 402 to decompress 1010 the predicted deltas Δ, and then reorders 1012 the data back to its original <x,y,z> tuple form. At this stage all of the prediction deltas Δ for the current surface are available in memory.

The geometry decompressor 406 next traverses 1014 each control vertex $P_{i,k}$ in the reference geometry file 502 in the manner described above with respect to FIG. 6, by zig-zagging across the rows of the surface. The geometry decompressor 406 identifies the seed vertices of the reference surface, again in the manner described above, as for example in conjunction with respect to FIG. 7. The seed vertices from the compressed geometry file 522 are copied to the corresponding vertices in the new offset surface.

Using the selected control vertex $P_{i,k}$ from the reference geometry file 502, geometry decompressor 406 selects 1016 a basis triangle, as described above, for example in conjunction with FIG. 8. As before, the vertices of the basis triangle will be either seed vertices or control vertices that have already been traversed. The geometry decompressor 406 also determines the corresponding basis triangle on the offset surface.

Next, the geometry decompressor 406 predicts 1018 the position of the offset vertex $P'_{i,k}$ in the offset surface using the coordinate system defined by the selected basis triangle, as described above with respect to FIG. 9 and Equation 1. As before, the coordinates of the offset basis triangle will be either seed vertices or vertices that have been previously traversed.

The geometry decompressor 406 then adds 1020 the corresponding prediction delta $\Delta_{i,k}$ to the predicted position $P'_{i,k}$ to obtain the final offset surface vertex O'.

This process is repeated for each control vertex for the surface, and the surface is written out the offset geometry file. When all of the surfaces have been traversed, the model has been reconstructed.

In the embodiments of the invention thus described, compression is achieved by storing the error of the prediction, rather than the underlying coordinate data itself. Generally these errors are small, and small numbers can pack into fewer bits of data than large numbers. Thus, the better the prediction function performs, the smaller the errors are, and the compression becomes better. Those of skill in the art then can readily devise alternative prediction functions that predict each offset vertex using the coordinate information of other vertices in the same surface as control vertex being predicted.

The order that control vertices are processed in the foregoing embodiments, although beneficial, is not essential to the operation of the invention. It is possible to traverse the control vertices in a different way than described. For instance, a hierarchical traversal may subdivide a lattice of points into quadrants or halves, and then subdivide again, and so on until every point has been traversed. The same prediction function can be used as long as the points in the offset triangle have either been stored or have already been traversed. The prediction function in this embodiment would take the four corners of the current quadrant and predict the intermediate center location in order to subdivide the quadrant.

The order or pattern of traversal may depend on the type of model. In the above embodiments for a NURBS model, the zig-zag traversal pattern of FIG. 6 is beneficial. For subdivision and polygon model, a triangle-based traversal pattern may be used instead. In this approach, polygons arranged into triangle strips or triangle fans can be traversed in the same order that they are defined, as long as the reference geometry and the offset geometry share the same number of points and connectivity of triangles.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer implemented method for compressing a file of an animation model for an animation cycle comprising a plurality of frames of animation of the animation model, the model comprising an offset model including a plurality of surfaces, each surface including a plurality of vertices, the method comprising:
   predicting offset vertices of the offset model for corresponding reference vertices of a reference model for a first frame of the animation cycle and associated with the offset model, using basis coordinate systems respectively associated with the reference vertices;
   determining differences between the predicted offset vertices and actual offset vertices of the offset model for each subsequent frame of the animation cycle; and
   storing as a compressed file in a database the reference model and differences between the predicted offset vertices and actual offset vertices to allow reconstruction of the actual offset vertices using the reference vertices and the differences for each subsequent frame of the animation cycle; wherein at least one basis coordinate system comprises a triangle defined by the vertices $P_{i,k-1}$, $P_{i+1,k-1}$, $P_{i+1,k-2}$ where the reference vertex is $P_{i,k}$, and is in an odd row of the surface, each vertex being a coordinate in (x,y,z) in local space of the reference model, i and k being respectively the row and column of a matrix of the vertices.

2. The method of claim 1, wherein at least one basis coordinate system comprises a set of vertices that are either seed vertices or vertices previously traversed.

3. The method of claim 1, wherein at least one basis coordinate system is a triangle defined by three vertices nearby the reference vertex.

4. The method of claim 1, wherein at least one basis coordinate system comprises a preconfigured triangle based on a location of the reference vertex.

5. A computer implemented method for compressing a file of an animation model for an animation cycle comprising a plurality of frames of animation of the animation model, the model comprising an offset model including a plurality of surfaces, each surface including a plurality of vertices, the method comprising:
   predicting offset vertices of the offset model for corresponding reference vertices of a reference model for a first frame of the animation cycle associated with the offset model, using basis coordinate systems respectively associated with the reference vertices;

determining differences between the predicted offset vertices and actual offset vertices of the offset model for each subsequent frame of the animation cycle; and storing as a compressed file in a database the reference model and the differences between the predicted offset vertices and actual offset vertices to allow reconstruction of the actual offset vertices using the reference vertices and the differences for each subsequent frame of the animation cycle; wherein at least one basis coordinate system comprises a triangle defined by the vertices $P_{i-1,k-1}$, $P_{i,k-1}$, $P_{i,k-2}$, where the reference vertex is $P_{i,k}$, and is in an even row of the surface, each vertex being a coordinate in (x,y,z) in local space of the reference model, i and k being respectively the row and column of a matrix of the vertices.

6. A computer implemented method for compressing a file of an animation model for an animation cycle comprising a plurality of frames of animation of the animation model, the model comprising an offset model including a plurality of surfaces, each surface including a plurality of vertices, the method comprising:

predicting offset vertices of the offset model for corresponding reference vertices of a reference model for a first frame of the animation cycle associated with the offset model, using basis coordinate systems respectively associated with the reference vertices;

determining differences between the predicted offset vertices and actual offset vertices of the offset model for each subsequent frame of the animation cycle; and storing as a compressed file in a database the reference model and the differences between the predicted offset vertices and actual offset vertices to allow reconstruction of the actual offset vertices using the reference vertices and the differences for each subsequent frame of the animation cycle; wherein at least one basis coordinate system comprises a triangle defined by the vertices $P_{i-1,k-1}$, $P_{i-1,k}$, $P_{i-2,k}$, where the reference vertex is $P_{i,k}$, and is in a last row of the surface, each vertex being a coordinate in (x,y,z) in local space of the reference model, i and k being respectively the row and column of a matrix of the vertices.

7. A computer implemented method for compressing a file of an animation model for an animation cycle comprising a plurality of frames of animation of the animation model, the model comprising an offset model including a plurality of surfaces, each surface including a plurality of vertices, the method comprising:

predicting offset vertices of the offset model for corresponding reference vertices of a reference model for a first frame of the animation cycle associated with the offset model, using basis coordinate systems respectively associated with the reference vertices;

determining differences between the predicted offset vertices and actual offset vertices of the offset model for each subsequent frame of the animation cycle; and storing as a compressed file in a database the reference model and the differences between the predicted offset vertices and actual offset vertices to allow reconstruction of the actual offset vertices using the reference vertices and the differences for each subsequent frame of the animation cycle; wherein at least one basis coordinate system comprises a triangle defined by the vertices $P_{i-1,k-1}$, $P_{i,k+1}$, $P_{i-2,k+1}$, where the reference vertex is $P_{i,k}$, and is the leftmost vertex in a last and odd row of the surface, each vertex being a coordinate in (x,y,z) in local space of the reference model, i and k being respectively the row and column of a matrix of the vertices.

8. The method of claim 1, wherein predicting offset vertices comprises for each offset vertex:

selecting a reference vertex on the reference model and a corresponding offset vertex;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system; and predicting the offset vertex by applying the position of the reference vertex in the basis coordinate system on the reference model to the basis coordinate system on the offset model.

9. The method of claim 8, wherein selecting a reference vertex on the reference model comprises traversing the surface of the reference model in a zig-zag pattern.

10. The method of claim 8, wherein predicting the offset vertex comprises:

determining a reference vector for the position of the reference vertex in the basis coordinate system on the reference model; and determining a corresponding offset vector for the reference vertex in the basis coordinate system of the offset model.

11. A computer implemented method for compressing a file of an animation model for an animation cycle comprising a plurality of frames of animation of the animation model, the model comprising an offset model including a plurality of surfaces, each surface including a plurality of vertices, the method comprising:

predicting offset vertices of the offset model for corresponding reference vertices of a reference model for a first frame of the animation cycle associated with the offset model, using basis coordinate systems respectively associated with the reference vertices;

determining differences between the predicted offset vertices and actual offset vertices of the offset model for each subsequent frame of the animation cycle; and storing as a compressed file in a database the reference model and the differences between the predicted offset vertices and actual offset vertices to allow reconstruction of the actual offset vertices using the reference vertices and the differences for each subsequent frame of the animation cycle;

wherein predicting offset vertices comprises for each offset vertex:

selecting a reference vertex on the reference model and a corresponding offset vertex, selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system; and predicting the offset vertex by applying the position of the reference vertex in the basis coordinate system on the reference model to the basis coordinate system on the offset model; wherein predicting the offset vertex comprises determining the offset vertex P'$_{i,k}$ from the equation:

$$\vec{P}'_{i,k} = (\vec{P}_{i,k} - \vec{A}) * \begin{bmatrix} \vec{s} \\ \vec{t} \\ \vec{r} \end{bmatrix}^{-1} \begin{bmatrix} \vec{s}' \\ \vec{t}' \\ \vec{r}' \end{bmatrix} + \vec{A}'$$

where:
P$_{i,k}$ is the reference vertex in the world space of the reference model, each vertex being a coordinate in (x,y,z) in local space of the reference model, i and k being respectively the row and column of a matrix of the vertices;
A, B, C are vertices of the basis coordinate system in the world space of the reference model, and
s'B−A, t=C−A, and r is normal to s and t, and has a length equal to the average length of s and t; s, r, and t each being a direction vector;
A', B', C' are vertices of the basis coordinate system in the world space of the offset model, and
s'=B'−A', t'=C'−A', and r' is normal to s' and t', and has a length equal to the average length of s' and t'.

12. The method of claim 1, further comprising:
selecting seed vertices; and
quantizing the seed vertices.

13. The method of claim 1, wherein predicting offset vertices comprises traversing the surface of the reference model in a zig-zag pattern.

14. The method of claim 1, wherein predicting offset vertices comprises traversing the surface of the reference model in a hierarchical traversal pattern.

15. The method of claim 1, wherein predicting offset vertices comprises traversing the surface of the reference model in a triangle-based traversal pattern.

16. The method of claim 1, further comprising quantizing the differences.

17. A computer implemented method for compressing a file of an animation model for an animation cycle comprising a plurality of frames of animation of the animation model, the model comprising an offset model including a plurality of surfaces, each surface including a plurality of vertices, the method comprising:
predicting offset vertices of the offset model for corresponding reference vertices of a reference model for a first frame of the animation cycle associated with the offset model, using basis coordinate systems respectively associated with the reference vertices;
determining differences between the predicted offset vertices and actual offset vertices of the offset model for each subsequent frame of the animation cycle; and
storing as a compressed file in a database the reference model and the differences between the predicted offset vertices and actual offset vertices to allow reconstruction of the actual offset vertices using the reference vertices and the differences for each subsequent frame of the animation cycle; wherein each difference comprises a vector having vector components, each vector component associated with an axis of a coordinate system, further comprising:
reordering vector components of the difference so that vector components associated with each axis are stored contiguously.

18. The method of claim 1, wherein storing the differences comprises compressing the differences into a compressed data set using an entropy based compression algorithm.

19. The method of claim 1, further comprising compressing seed vertices using an entropy based compression algorithm.

20. A computer implemented method for compressing a file of an animation model, the model comprising an offset model including a plurality of surfaces, each surface including a plurality of vertices, the method comprising:
traversing a plurality of reference vertices on a surface of a reference model for a first frame of the animation cycle and associated with the offset model, and for each reference vertex:
selecting an offset vertex of the offset model corresponding to the reference vertex;
selecting a basis coordinate system on the reference model with respect to the reference vertex, the basis coordinate system defined by vertices nearby the reference vertex, the basis coordinate system providing the basis coordinates for the reference vertex;
selecting a basis coordinate system on the offset model;
determining a position of the reference vertex in the basis coordinate system on the reference model; and
predicting the offset vertex by applying the position of the reference vertex in the basis coordinate system on the reference model to the basis coordinate system on the offset model;
determining a difference between the predicted offset vertex and an actual offset vertex of the offset model for each subsequent frame of the animation model; and
storing as a compressed file in a database the reference model and the difference between the predicted offset vertex and actual offset vertex for each subsequent frame of the animation cycle; wherein at least one basis coordinate system comprises a triangle defined by the vertices P$_{i-1,k-1}$, P$_{i+1,k-2}$ where the reference vertex is P$_{i,k}$, and is in an odd row of the surface, each vertex being a coordinate in (x,y,z) in local space of the reference model, i and k being respectively the row and column of a matrix of the vertices.

21. The method of claim 20, wherein at least one basis coordinate system comprises a set of vertices that are either seed vertices or vertices previously traversed.

22. The method of claim 20, wherein at least one basis coordinate system is a triangle defined by three vertices nearby the reference vertex.

23. The method of claim 20, wherein at least one basis coordinate system comprises a preconfigured triangle based on a location of the reference vertex.

24. A computer implemented method for compressing a file of an animation model, the model comprising an offset model including a plurality of surfaces, each surface including a plurality of vertices, the method comprising:
traversing a plurality of reference vertices on a surface of a reference model for a first frame of the animation cycle associated with the offset model, and for each reference vertex:
selecting an offset vertex of the offset model corresponding to the reference vertex;
selecting a basis coordinate system on the reference model with respect to the reference vertex, the basis coordinate system defined by vertices nearby the reference vertex, the basis coordinate system providing the basis coordinates for the reference vertex;
selecting a basis coordinate system on the offset model;

determining a position of the reference vertex in the basis coordinate system on the reference model; and predicting the offset vertex by applying the position of the reference vertex in the basis coordinate system on the reference model to the basis coordinate system on the offset model;

determining a difference between the predicted offset vertex and an actual offset vertex of the offset model for each subsequent frame of the animation model; and storing as a compressed file in a database the reference model and the difference between the predicted offset vertex and actual offset vertex for each subsequent frame of the animation cycle; wherein at least one basis coordinate system comprises a triangle defined by the vertices $P_{i-1,k-1}$, $P_{i,k-1}$, $P_{i,k-2}$, where the reference vertex is $P_{i,k}$, and is in an even row of the surface, each vertex being a coordinate in (x,y,z) in local space of the reference model, i and k being respectively the row and column of a matrix of the vertices.

25. A computer implemented method for compressing a file of an animation model, the model comprising an offset model including a plurality of surfaces, each surface including a plurality of vertices, the method comprising:

traversing a plurality of reference vertices on a surface of a reference model for a first frame of the reference model and associated with the offset model, and for each reference vertex:

selecting an offset vertex of the offset model corresponding to the reference vertex;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model; and predicting the offset vertex by applying the position of the reference vertex in the basis coordinate system on the reference model to the basis coordinate system on the offset model;

determining a difference between the predicted offset vertex and an actual offset vertex of the offset model for each subsequent frame of the animation model; and storing as a compressed file in a database the reference model and the difference between the predicted offset vertex and actual offset vertex for each subsequent frame of the animation cycle; wherein at least one basis coordinate system comprises a triangle defined by the vertices $P_{i-1,k-1}$, $P_{i-1,k}$, $P_{i-2,k}$, where the reference vertex is $P_{i,k}$, and is in a last row of the surface, each vertex being a coordinate in (x,y,z) in local space of the reference model, i and k being respectively the row and column of a matrix of the vertices.

26. A computer implemented method for compressing a file of an animation model, the model comprising an offset model including a plurality of surfaces, each surface including a plurality of vertices, the method comprising:

traversing a plurality of reference vertices on a surface of a reference model for a first frame of the reference model and associated with the offset model, and for each reference vertex:

selecting an offset vertex of the offset model corresponding to the reference vertex;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model; and predicting the offset vertex by applying the position of the reference vertex in the basis coordinate system on the reference model to the basis coordinate system on the offset model;

determining a difference between the predicted offset vertex and an actual offset vertex of the offset model for each subsequent frame of the animation model; and storing as a compressed file in a database the reference model and the difference between the predicted offset vertex and actual offset vertex for each subsequent frame of the animation cycle; wherein at least one basis coordinate system comprises a triangle defined by the vertices $P_{i-1,k}$, $P_{i,k+1}$, $P_{i-2,k+1}$, where the reference vertex is $P_{i,k}$, and is the leftmost vertex in a last and odd row of the surface, each vertex being a coordinate in (x,y,z) in local space of the reference model, i and k being respectively the row and column of a matrix of the vertices.

27. The method of claim 20, wherein predicting the offset vertex comprises:

determining a reference vector for the position of the reference vertex in the basis coordinate system on the reference model; and determining a corresponding offset vector for the reference vertex in the basis coordinate system of the offset model.

28. A computer implemented method for compressing a file of an animation model, the model comprising an offset model including a plurality of surfaces, each surface including a plurality of vertices, the method comprising:

traversing a plurality of reference vertices on a surface of a reference model for a first frame of the reference model and associated with the offset model, and for each reference vertex:

selecting an offset vertex of the offset model corresponding to the reference vertex;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model; and predicting the offset vertex by applying the position of the reference vertex in the basis coordinate system on the reference model to the basis coordinate system on the offset model;

determining a difference between the predicted offset vertex and an actual offset vertex of the offset model for each subsequent frame of the animation model; and storing as a compressed file in a database the reference model and the difference between the predicted offset vertex and actual offset vertex for each subsequent frame of the animation cycle; wherein predicting the offset vertex comprises determining the offset vertex $P'_{i,k}$ from the equation:

$$\vec{P}'_{i,k} = (\vec{P}_{i,k} - \vec{A}) * \begin{bmatrix} \vec{s} \\ \vec{t} \\ \vec{r} \end{bmatrix}^{-1} \begin{bmatrix} \vec{s}' \\ \vec{t}' \\ \vec{r}' \end{bmatrix} + \vec{A}'$$

where:
- $P_{i,k}$ is the reference vertex in the world space of the reference model, each vertex being a coordinate in (x,y,z) in local space of the reference model, i and k being respectively the row and column of a matrix of the vertices;
- A, B, C are vertices of the basis coordinate system in the world space of the reference model, and
- s'B−A, t=C−A, and r is normal to s and t, and has a length equal to the average length of s and t; s, r and t each being a direction vector;
- A', B', C' are vertices of the basis coordinate system in the world space of the offset model, and
- s'=B'−A', t'=C'−A', and r' is normal to s' and t', and has a length equal to the average length of s' and t'.

29. The method of claim 1, further comprising:
selecting seed vertices; and
quantizing the seed vertices.

30. The method of claim 20, wherein traversing a plurality of reference vertices comprises traversing the reference vertices in a zig-zag pattern.

31. The method of claim 20, wherein traversing a plurality of reference vertices comprises traversing the reference vertices in a zig-zag pattern between adjacent rows of reference vertices.

32. The method of claim 20, wherein traversing a plurality of reference vertices comprises traversing the surface of the reference model in a hierarchical traversal pattern.

33. The method of claim 20, wherein traversing a plurality of reference vertices comprises traversing the surface of the reference model in a triangle-based traversal pattern.

34. The method of claim 20, wherein storing the difference between the predicted offset vertex and actual offset vertex comprises quantizing the difference before storing.

35. A computer implemented method for compressing a file of an animation model, the model comprising an offset model including a plurality of surfaces, each surface including a plurality of vertices, the method comprising:
traversing a plurality of reference vertices on a surface of a reference model for a first frame of the reference model and associated with the offset model, and for each reference vertex:
selecting an offset vertex of the offset model corresponding to the reference vertex;
selecting a basis coordinate system on the reference model with respect to the reference vertex, the basis coordinate system defined by vertices nearby the reference vertex, the basis coordinate system providing the basis coordinates for the reference vertex;
selecting a basis coordinate system on the offset model;
determining a position of the reference vertex in the basis coordinate system on the reference model; and
predicting the offset vertex by applying the position of the reference vertex in the basis coordinate system on the reference model to the basis coordinate system on the offset model;
determining a difference between the predicted offset vertex and an actual offset vertex of the offset model for each subsequent frame of the animation model; and
storing as a compressed file in a database the reference model and the difference between the predicted offset vertex and actual offset vertex for each subsequent frame of the animation cycle; wherein storing the difference between the predicted offset vertex and actual offset vertex comprises reordering vector components of the difference so that vector components associated with each axis are stored contiguously.

36. The method of claim 20, wherein storing the difference between the predicted offset vertex and actual offset vertex comprises compressing the difference into a compressed data set using an entropy based compression algorithm.

37. The method of claim 20, further comprising compressing seed vertices using an entropy based compression algorithm.

38. A computer implemented method for decompressing a compressed animation model file for an animation cycle comprising a plurality of frames of animation of the animation model, the model representing an offset model including a plurality of surfaces, each surface including a plurality of vertices, the method comprising:
predicting offset vertices of the offset model from corresponding reference vertices of a reference model for a first frame of the animation cycle and associated with the offset model, using basis coordinate systems respectively associated with the reference vertices;
retrieving from a database the compressed animation model file, previously stored differences between the predicted offset vertices and actual offset vertices of the offset model for each subsequent frame of the animation cycle; and
combining the predicted offset vertices and the retrieved differences to produce the offset vertices of the offset model for each subsequent frame of the animation cycle; wherein at least one basis coordinate system comprises a triangle defined by the vertices $P_{i-1,k}$, $P_{i,k-1}$, $P_{i+1,k-2}$ where the reference vertex is $P_{i,k}$, and is in an odd row of the surface, each vertex being a coordinate in (x,y,z) in local space of the reference model, i and k being respectively the row and column of a matrix of the vertices.

39. The method of claim 38, wherein at least one basis coordinate system comprises a set of vertices that are either seed vertices or vertices previously traversed.

40. The method of claim 38, wherein at least one basis coordinate system is a triangle defined by three vertices nearby the reference vertex.

41. The method of claim 38, wherein at least one basis coordinate system comprises a preconfigured triangle based on a location of the reference vertex.

42. A computer implemented method for decompressing a compressed animation model file for an automation cycle comprising a plurality of frames of animation of the animation model, the model representing an offset model including a plurality of surfaces, each surface including a plurality of vertices, the method comprising:
predicting offset vertices of the offset model from corresponding reference vertices of a reference model for a first frame of the animation cycle associated with the offset model, using basis coordinate systems respectively associated with the reference vertices;
retrieving from a database the compressed animation model file, previously stored differences between the predicted offset vertices and actual offset vertices of the offset model for each subsequent frame of the animation cycle; and combining the predicted offset vertices and the stored differences to produce the offset vertices of the offset model for each subsequent frame of the animation cycle; wherein at least one basis coordinate system comprises a triangle defined by the vertices $P_{i-1,k-1}$, $P_{i,k-1}$, $P_{i,k-2}$, where the reference vertex is $P_{i,k}$, and is in an even row of the surface, each vertex being a coordinate in (x,y,z) in local space of the reference model, i and k being respectively the row and column of a matrix of the vertices.

43. A computer implemented method for decompressing a compressed animation model file for an automation cycle comprising a plurality of frames of animation of the animation model, the model representing an offset model including a plurality of surfaces, each surface including a plurality of vertices, the method comprising:
predicting offset vertices of the offset model from corresponding reference vertices of a reference model for a first frame of the animation cycle associated with the offset model, using basis coordinate systems respectively associated with the reference vertices;
retrieving from a database the compressed animation model file, previously stored differences between the predicted offset vertices and actual offset vertices of the offset model for each subsequent frame of the animation cycle; and
combining the predicted offset vertices and the stored differences to produce the offset vertices of the offset model for each subsequent frame of the animation cycle; wherein at least one basis coordinate system comprises a triangle defined by the vertices $P_{i-1,k-1}$, $P_{i-1,k}$, $P_{i-2,k}$, where the reference vertex is $P_{i,k}$, and is in a last row of the surface, each vertex being a coordinate in (x,y,z) in local space of the reference model, i and k being respectively the row and column of a matrix of the vertices.

44. A computer implemented method for decompressing a compressed animation model file for an automation cycle comprising a plurality of frames of animation of the animation model, the model representing an offset model including a plurality of surfaces, each surface including a plurality of vertices, the method comprising:
predicting offset vertices of the offset model from corresponding reference vertices of a reference model for a first frame of the animation cycle associated with the offset model, using basis coordinate systems respectively associated with the reference vertices;
retrieving from a database the compressed animation model file, previously stored differences between the predicted offset vertices and actual offset vertices of the offset model for each subsequent frame of the animation cycle; and
combining the predicted offset vertices and the stored differences to produce the offset vertices of the offset model for each subsequent frame of the animation cycle; wherein at least one basis coordinate system comprises a triangle defined by the vertices $P_{i-1,k, Pi,k+1}$, $P_{i-2,k+1}$, where the reference vertex is $P_{i,k}$, and is the leftmost vertex in a last and odd row of the surface, each vertex being a coordinate in (x,y,z) in local space of the reference model, i and k being respectively the row and column of a matrix of the vertices.

45. The method of claim 38, wherein predicting offset vertices comprises for each offset vertex:
selecting a reference vertex on the reference model and a corresponding offset vertex;
selecting a basis coordinate system on the reference model with respect to the reference vertex, the basis coordinate system defined by vertices nearby the reference vertex, the basis coordinate system providing the basis coordinates for the reference vertex;
selecting a basis coordinate system on the offset model;
determining a position of the reference vertex in the basis coordinate system; and
predicting the offset vertex by applying the position of the reference vertex in the basis coordinate system on the reference model to the basis coordinate system on the offset model.

46. The method of claim 45, wherein predicting the offset vertex, comprises:
determining a reference vector for the position of the reference vertex in the basis coordinate system on the reference model; and
determining a corresponding offset vector for the reference vertex in the basis coordinate system of the offset model.

47. A computer implemented method for decompressing a compressed animation model file for an automation cycle comprising a plurality of frames of animation of the animation model, the model representing an offset model including a plurality of surfaces, each surface including a plurality of vertices, the method comprising:
predicting offset vertices of the offset model from corresponding reference vertices of a reference model for a first frame of the animation cycle associated with the offset model, using basis coordinate systems respectively associated with the reference vertices;
retrieving from a database the compressed animation model file, previously stored differences between the predicted offset vertices and actual offset vertices of the offset model for each subsequent frame of the animation cycle; and
combining the predicted offset vertices and the stored differences to produce the offset vertices of the offset model for each subsequent frame of the animation cycle; wherein predicting the offset vertex, comprises determining the offset vertex $P'_{i,k}$ from the equation:

$$\vec{P}'_{i,k} = (\vec{P}_{i,k} - \vec{A}) * \begin{bmatrix} \vec{s} \\ \vec{t} \\ \vec{r} \end{bmatrix}^{-1} \begin{bmatrix} \vec{s}' \\ \vec{t}' \\ \vec{r}' \end{bmatrix} + \vec{A}'$$

where:
$P_{i,k}$ is the reference vertex in the world space of the reference model, each vertex being a coordinate in (x,y,z) in local space of the reference model, i and k being respectively the row and column of a matrix of the vertices;
A, B, C are vertices of the basis coordinate system in the world space of the reference model, and
s'B−A, t=C−A, and r is normal to s and t, and has a length equal to the average length of s and t; s, r, and t each being a direction vector;
A', B', C' are vertices of the basis coordinate system in the world space of the offset model, and
s'=B'−A', t'=C'−A', and r' is normal to s' and t', and has a length equal to the average length of s' and t'.

48. A computer implemented method for decompressing a compressed animation model file for an automation cycle comprising a plurality of frames of animation of the animation model, the model representing an offset model including a plurality of surfaces each surface including a plurality of vertices, the method comprising:

predicting offset vertices of the offset model from corresponding reference vertices of a reference model for a first frame of the animation cycle associated with the offset model, using basis coordinate systems respectively associated with the reference vertices;

retrieving from a database the compressed animation model file, previously stored differences between the predicted offset vertices and actual offset vertices of the offset model for each subsequent frame of the animation cycle; and combining the predicted offset vertices and the stored differences to produce the offset vertices of the offset model for each subsequent frame of the animation cycle; wherein retrieving from the compressed animation model stored differences comprises:

reordering vector components of the differences from being continuously stored for each axis of a coordinate system to being grouped into coordinate tuple form.

49. A computer implemented method for decompressing a compressed animation model file for an automation cycle comprising a plurality of frames of animation of the animation model, the model representing an offset model including a plurality of surfaces, each surface including a plurality of vertices, the method comprising:

predicting offset vertices of the offset model from corresponding reference vertices of a reference model for a first frame of the animation cycle associated with the offset model, using basis coordinate systems respectively associated with the reference vertices;

retrieving from a database the compressed animation model file, previously stored differences between the predicted offset vertices and actual offset vertices of the offset model for each subsequent frame of the animation cycle; and combining the predicted offset vertices and the stored differences to produce the offset vertices of the offset model for each subsequent frame of the animation cycle; retrieving from the compressed animation model stored differences comprises decompressing the differences into an uncompressed form using an entropy based decompression algorithm.

50. A computer implemented method for decompressing a compressed animation model file for an automation cycle comprising a plurality of frames of animation of the animation model, the model representing an offset model including a plurality of surfaces, each surface including a plurality of vertices, the method comprising:

predicting offset vertices of the offset model from corresponding reference vertices of a reference model for a first frame of the animation cycle associated with the offset model, using basis coordinate systems respectively associated with the reference vertices;

retrieving from a database the compressed animation model file, previously stored differences between the predicted offset vertices and actual offset vertices of the offset model for each subsequent frame of the animation cycle; and combining the predicted offset vertices and the stored differences to produce the offset vertices of the offset model for each subsequent frame of the animation cycle; further comprising decompressing seed vertices into an uncompressed form using an entropy based decompression algorithm, and using the seed vertices as a reference vertices.

51. The method of claim 38, wherein predicting offset vertices comprises traversing the surface of the reference model in a zig-zag pattern.

52. The method of claim 38, wherein predicting offset vertices comprises traversing the surface of the reference model in a hierarchical traversal pattern.

53. The method of claim 38, wherein predicting offset vertices comprises traversing the surface of the reference model in a triangle based traversal pattern.

54. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle and associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted, offset vertex and the retrieved difference to produce a final offset vertex of the offset model for each subsequent frame of the animation cycle; wherein at least one basis coordinate system comprises a triangle defined by the vertices $P_{i,k-1}$, $P_{i+1,k-1}$, $P_{i+1,k-2}$ where the reference vertex is $P_{i,k}$, and is in an odd row of the surface.

55. The method of claim 54, wherein at least one basis coordinate system comprises a set of vertices that are either seed vertices or vertices previously traversed.

56. The method of claim 54, wherein at least one basis coordinate system is a triangle defined by three vertices nearby the reference vertex.

57. The method of claim 54, wherein at least one basis coordinate system comprises a preconfigured triangle based on a location of the reference vertex.

58. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle; wherein at least one basis coordinate system comprises a triangle defined by the vertices $P_{i-1,k-1}$, $P_{i,k-1}$, $P_{i,k-2}$, where the reference vertex is Pi k, and is in an even row of the surface, each vertex being a coordinate in (x,y,z) in local space of the reference model, i and k being respectively the row and column of a matrix of the vertices.

59. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle; wherein at least one basis coordinate system comprises a triangle defined by the vertices $P_{i-1,k-1}$, $P_{i-1,k}$, $P_{i-2,k}$, where the reference vertex is Pi k, and is in a last row of the surface, each vertex being a coordinate in (x,y,z) in local space of the reference model, i and k being respectively the row and column of a matrix of the vertices.

60. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle; wherein at least one basis coordinate system comprises a triangle defined by the vertices $P_{i-1,k}$, $P_{i,k+1}$, $P_{i-2,k+1}$, where the reference vertex is $P_{i,k}$, and is the leftmost vertex in a last and odd row of the surface, each vertex being a coordinate in (x,y,z) in local space of the reference model, i and k being respectively the row and column of a matrix of the vertices.

61. The method of claim 54, wherein predicting the offset vertex, comprises:

determining a reference vector for the position of the reference vertex in the basis coordinate system on the reference model; and determining a corresponding offset vector for the reference vertex in the basis coordinate system of the offset model.

62. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle wherein predicting the offset vertex, comprises determining the offset vertex P'$_{i,k}$ from the equation:

$$\vec{P}'_{i,k} = (\vec{P}_{i,k} - \vec{A}) * \begin{bmatrix} \vec{s} \\ \vec{t} \\ \vec{r} \end{bmatrix}^{-1} \begin{bmatrix} \vec{s}' \\ \vec{t}' \\ \vec{r}' \end{bmatrix} + \vec{A}'$$

where:

P$_{i,k}$ is the reference vertex in the world space of the reference model, each vertex being a coordinate in (x,y,z) in local space of the reference model, i and k being respectively the row and column of a matrix of the vertices;

A, B, C are vertices of the basis coordinate system in the world space of the reference model, and s'B−A, t=C−A, and r is normal to s and t, and has a length equal to the average length of s and t; s, r, and t each being a direction vector;

A', B', C' are vertices of the basis coordinate system in the world space of the offset model, and s'B'−A', t'=C'−A', and r' is normal to s' and t', and has a length equal to the average length of s' and t'.

63. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle; wherein retrieving from the compressed animation model a stored difference comprises:

reordering vector components of the difference from being continuously stored for each axis of a coordinate system to being grouped into coordinate tuple form.

64. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex, selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle, wherein retrieving from the compressed animation model a stored difference comprises decompressing the difference into an uncompressed form using an entropy based decompression algorithm.

65. A computer implemented method for decompressing a compressed animation model file for an animation cycle comprising a plurality of frames of animation of the animation model, the model representing an offset model including a plurality of surfaces, each surface including a plurality of vertices, the method comprising:

traversing a plurality of reference vertices on a surface of a reference model for a first frame of the animation cycle associated with the offset model, and for each reference vertex:

retrieving from a database for the compressed animation model file a previously stored difference between a predicted offset vertex and an actual offset vertex of the offset model for each subsequent frame of the animation cycle;

selecting a basis coordinate system on the reference model with respect to the reference vertex, the basis coordinate system defined by vertices nearby the reference vertex, the basis coordinate system providing the basis coordinates for the reference vertex;

selecting a basis coordinate system on the offset model;

determining a position of the reference vertex in the basis coordinate system on the reference model;

predicting the offset vertex by applying the position of the reference vertex in the basis coordinate system on the reference model to the basis coordinate system on the offset model; and combining the predicted offset vertex and the stored difference to produce a final offset vertex of the offset model for each subsequent frame of the animation cycle: further comprising decompressing a seed vertex into an uncompressed form using an entropy based decompression algorithm, and using the seed vertex as a reference vertex.

66. The method of claim 54, wherein traversing a plurality of reference vertices comprises traversing the surface of the reference model in a zig-zag pattern.

67. The method of claim 54, wherein traversing a plurality of reference vertices comprises traversing the surface of the reference model in a hierarchical traversal pattern.

68. The method of claim 54, wherein traversing a plurality of reference vertices comprises traversing the surface of the reference model in a triangle-based traversal pattern.

69. A system for compressing an animation model for an animation cycle comprising a plurality of frames of an animation cycle of the animation model, the model comprising an offset model including a plurality of surfaces, each surface including a plurality of vertices, the system comprising:
  a model database that stores a reference model for a first frame of the animation cycle; and
  a geometry compression module that predicts offset vertices of the offset model for corresponding reference vertices of the reference model associated with the offset model, using basis coordinate systems respectively associated with the reference vertices, determines differences between the predicted offset vertices and actual offset vertices of the offset model for each subsequent frame of the animation cycle, and stores the reference model and differences between the predicted offset vertices and actual offset vertices as a compressed offset model in the model database to allow reconstruction of the actual offset vertices using the reference vertices and the differences; each difference comprises a vector having vector components, each vector component associated with an axis of a coordinate system, the system further comprising:
  a data reordering module that reorders the vector components of the differences so that vector components associated with each axis are stored contiguously.

70. The system of claim 69, further comprising:
  a quantization module that quantizes the differences prior to storing in the compressed offset model.

71. The system of claim 69, further comprising:
  a data compression module that compresses the differences using an entropy based compression algorithm prior to storing in the compressed offset model.

72. The system of claim 69, wherein the geometry compression module predicts offset vertices by:
  selecting a reference vertex on the reference model and a corresponding offset vertex;
  selecting a basis coordinate system on the reference model with respect to the reference vertex, the basis coordinate system defined by vertices nearby the reference vertex, the basis coordinate system providing the basis coordinates for the reference vertex;
  selecting a basis coordinate system on the offset model;
  determining a position of the reference vertex in the basis coordinate system; and
  predicting the offset vertex by applying the position of the reference vertex in the basis coordinate system on the reference model to the basis coordinate system on the offset model.

73. A system for decompressing a compressed animation model for an animation cycle comprising a plurality of frames of animation of the animation model, the model representing an offset model including a plurality of surfaces, each surface including a plurality of vertices, the system comprising:
  a model database that stores a reference model for a first frame of the animation model and a compressed animation model; and
  a geometry decompression module that predicts offset vertices of the offset model from corresponding reference vertices of the reference model associated with the offset model for each subsequent frame of the animation cycle, using basis coordinate systems respectively associated with the reference vertices, retrieves from the compressed animation model stored differences between the predicted offset vertices and actual offset vertices of the offset model, and combines the predicted offset vertices and the stored differences to produce the offset vertices of the offset model for each subsequent frame of the animation cycle; further comprising:
  a data reordering module that reorders vector components of the differences from being continuously stored for each axis of a coordinate system to being grouped into coordinate tuple form.

74. The system of claim 73, further comprising:
  a data decompression module that decompresses the stored differences using an entropy based decompression algorithm.

75. The system of claim 73, wherein the geometry decompression module predicts offset vertices by:
  selecting a reference vertex on the reference model and a corresponding offset vertex;
  selecting a basis coordinate system on the reference model with respect to the reference vertex, the basis coordinate system defined by vertices nearby the reference vertex, the basis coordinate system providing the basis coordinates for the reference vertex;
  selecting a basis coordinate system on the offset model;
  determining a position of the reference vertex in the basis coordinate system; and
  predicting the offset vertex by applying the position of the reference vertex in the basis coordinate system on the reference model to the basis coordinate system on the offset model.

* * * * *